United States Patent
Fukada et al.

(10) Patent No.: US 11,236,015 B2
(45) Date of Patent: Feb. 1, 2022

(54) TEMPERED GLASS (71) Applicant: NIPPON ELECTRIC GLASS CO., LTD., Otsu (JP)

(72) Inventors: Mutsumu Fukada, Otsu (JP); Kiyotaka Kinoshita, Otsu (JP)

(73) Assignee: NIPPON ELECTRIC GLASS CO., LTD., Otsu (JP)

(*) Notice: Subject to any disclaimer, the term of this patent is extended or adjusted under 35 U.S.C. 154(b) by 736 days.

(21) Appl. No.: 15/568,145

(22) PCT Filed: Mar. 29, 2016

(86) PCT No.: PCT/JP2016/060023
§ 371 (c)(1),
(2) Date: Oct. 20, 2017

(87) PCT Pub. No.: WO2016/170931
PCT Pub. Date: Oct. 27, 2016

(65) Prior Publication Data
US 2018/0118615 A1   May 3, 2018

(30) Foreign Application Priority Data

Apr. 23, 2015  (JP) ............... JP2015-088017

(51) Int. Cl.
*C03C 21/00* (2006.01)
*C03C 3/093* (2006.01)
(Continued)

(52) U.S. Cl.
CPC ............ *C03C 21/002* (2013.01); *C03C 3/085* (2013.01); *C03C 3/087* (2013.01); *C03C 3/091* (2013.01);
(Continued)

(58) Field of Classification Search
None
See application file for complete search history.

(56) References Cited

U.S. PATENT DOCUMENTS

| | | |
|---|---|---|
| RE44,869 E | 4/2014 | Ellison et al. |
| 2008/0286548 A1 | 11/2008 | Ellison et al. |

(Continued)

FOREIGN PATENT DOCUMENTS

| | | |
|---|---|---|
| CN | 101772470 A | 7/2010 |
| CN | 103842311 A | 6/2014 |

(Continued)

OTHER PUBLICATIONS

Translation of Murata JP2010-116276 (Year: 2010).*

(Continued)

*Primary Examiner* — David Sample
(74) *Attorney, Agent, or Firm* — Faegre Drinker Biddle & Reath LLP (57) ABSTRACT

A tempered glass has a sheet thickness of 0.6 mm or less and having a compression stress layer resulting from chemical tempering at a surface thereof, which satisfies requirements of $CS\times(DOL-20)/DOL>360$ and $DOL/t\leq0.20$ when the compression stress value of the compression stress layer is represented by CS (Mpa), the depth of the compression stress layer is represented by DOL (μm), and the sheet thickness is represented by t (μm).

8 Claims, 1 Drawing Sheet

(51) Int. Cl.
  *C03C 3/087* (2006.01)
  *C03C 3/097* (2006.01)
  *C03C 3/091* (2006.01)
  *C03C 3/085* (2006.01)
  *C03C 3/078* (2006.01)

(52) U.S. Cl.
  CPC .............. *C03C 3/093* (2013.01); *C03C 3/097* (2013.01); *C03C 3/078* (2013.01)

(56) References Cited

U.S. PATENT DOCUMENTS

| | | |
|---|---|---|
| 2009/0197088 A1 | 8/2009 | Murata |
| 2014/0370264 A1 | 12/2014 | Ohara et al. |
| 2015/0030834 A1 | 1/2015 | Morey et al. |
| 2015/0239775 A1* | 8/2015 | Amin .................. C03C 3/091 428/220 |
| 2016/0083292 A1 | 3/2016 | Tabe et al. |
| 2016/0102015 A1* | 4/2016 | Yasuda ................ C03C 3/087 428/220 |
| 2016/0318796 A1 | 11/2016 | Masuda |
| 2018/0009706 A1 | 1/2018 | Luo et al. |

FOREIGN PATENT DOCUMENTS

| | | | | |
|---|---|---|---|---|
| JP | H11-328601 A | | 11/1999 | |
| JP | 2010-116276 A | | 5/2010 | |
| JP | 2010-527892 A | | 8/2010 | |
| JP | 2011213576 A | * | 10/2011 | .......... C03C 21/002 |
| JP | 5293908 B1 | | 9/2013 | |
| JP | 2014-141363 A | | 8/2014 | |
| JP | 2014141363 A | * | 8/2014 | |
| JP | A-2016-000682 | | 1/2016 | |
| JP | T-2018-511550 | | 4/2018 | |
| TW | A-201315692 | | 4/2013 | |
| TW | A-201600475 | | 1/2016 | |
| WO | WO-2011/114821 A1 | | 9/2011 | |
| WO | WO-2013/051514 A1 | | 4/2013 | |
| WO | WO-2013051514 A | * | 4/2013 | |
| WO | WO-2013/191110 A1 | | 12/2013 | |
| WO | WO-2014/030738 A1 | | 2/2014 | |
| WO | WO-2014/189117 A1 | | 11/2014 | |
| WO | WO-A1-2015-080043 | | 6/2015 | |
| WO | WO-2015178175 A1 | * | 11/2015 | ............. C03C 3/085 |

OTHER PUBLICATIONS

JP Office Action dated Oct. 8, 2019 from corresponding Japanese patent application No. 2017-514037 (with attached English-language translation).
International Search Report/Written Opinion dated Jun. 7, 2016 for PCT/JP2016/060023 [Japanese language].
International Search Report dated Jun. 7, 2016 for PCT/JP2016/060023.
TW Office Action dated Nov. 19, 2019 from corresponding Taiwanese patent application No. 105118835 (with attached English-language translation).
JP Office Action dated Dec. 10, 2019 from corresponding Japanese patent application No. 2017-514037 (with attached English-language translation).
CN Office Action dated Nov. 14, 2019 in Chinese Application No. 201680025340.7 (with attached English-language translation).
TW Office Action dated May 3, 2019 from corresponding Taiwanese patent application No. 105118835 (with attached English-language translation).
Office Action dated Apr. 20, 2020 in Taiwanese Patent Application No. 105118835 (5 pages) with an English translation (3 pages).
The Second Office Action dated Aug. 5, 2020 in Chinese Patent Application No. 201680025340.7 (5 pages) with an English translation (7 pages).
Notification of Reason for Refusal dated Mar. 19, 2021 in Korean Patent Application No. 10-2017-7030521 (4 pages) with an English translation (4 pages).

* cited by examiner

TEMPERED GLASS

TECHNICAL FIELD

The present invention relates to a tempered glass and particularly a tempered glass suitable for a cover glass or the like of mobile terminals such as a cellular phone, a smartphone, and a tablet terminal.

BACKGROUND ART

Mobile terminals such as a cellular phone, a smartphone, and a tablet terminal show a tendency of further prevalence. For these applications, a tempered glass subjected to a tempering treatment such as an ion exchange treatment has been used.

In the case where the tempered glass mounted on a smart phone or the like is broken, the breakage is roughly classified into "face breakage" which has a starting point at the surface and "edge breakage" which has a starting point at an end face.

The face breakage frequently generates resulting from striking of a protrusion harder than glass or having hardness equivalent to glass onto a glass surface, and the edge breakage frequently generates at the time when impact is imparted to an end part or when bending stress is locally imparted thereto. With regard to the edge breakage, the material, rigidity, and the like of a smartphone body or the like are dominant but, with regard to the face breakage, easiness of breakage is determined by characteristics of glass. Therefore, stress profile design of the tempered glass becomes more important.

When the face breakage is precisely described, the way of breakage includes roughly two modes. That is, there are a mode in which an object having a sharp protrusion strikes the glass surface and the glass is broken due to the generation of a crack that pierces a compression stress layer (Mode 1), and a mode in which an object having a blunt protrusion strikes the glass surface and the glass is broken due to the generation of a crack that does not pierce a compression stress layer (Mode 2). The breakage of the cover glass frequently generates as a result of dropping the smartphone or the like but the pattern of the drop depends on the case and it is required to have high resistance to any mode of breakage.

For example, Patent Document 1 refers to the breakage of Mode 1 as slow crack breakage and proposes to perform a chemical strengthening step twice with performing an intervening heat treatment step. In the tempered glass thus prepared, a position at which a compression stress value becomes a half thereof (HW) is present near the surface of the compression stress layer.

BACKGROUND ART DOCUMENTS

Patent Documents

Patent Document 1: Japanese Patent No. 5293908

SUMMARY OF THE PRESENT INVENTION

Problems That the Present Invention is to Solve

However, in the method proposed in Patent Document 1, it is a main purpose to prevent the generation of the breakage of Mode 1 and the breakage of Mode 2 is not sufficiently considered. Further, since the method required the chemical tempering step twice and the heat treatment step once, it costs high and takes labor and time, and also it is difficult to stabilize quality.

Moreover, owing to the demand for thinning the cover glass as the thinning of a smartphone has been increasingly demanded in recent years, there is a tendency that the breakage of Mode 2 is prone to generate increasingly.

An object of the present invention is to provide a tempered glass that has good productivity and that is resistant to any modes of breakage at surface.

Means for Solving the Problems

As a result of various studies, the present inventors have found good resistance to the breakage of Mode 2 is obtained even by performing a chemical tempering step once when stress profile design is performed so that a compression stress value at a depth of about 20 μm from the surface becomes substantially high. However, the breakage of Mode 1 is prone to generate as the internal tensile stress value (CT) of a tempered glass increases. When the resistance to the breakage of Mode 2 is thus increased, the internal tensile stress value becomes large and the breakage of Mode 1 is prone to generate. This tendency becomes obvious as the sheet thickness decreases. Accordingly, the present inventors have further studied and have found that the resistance to the breakage of the both modes can be achieved at a high level by controlling the depth of the compression stress layer to a certain ratio of the sheet thickness or less. Thus, the present inventors have proposed the present invention. The internal tensile stress value is a value determined from the following equation 1 using the compression stress value CS (MPa), the depth of the compression stress layer DOL (μm), and the sheet thickness t (μm).

$$CT=(CS \cdot DOL)/(t-2 \cdot DOL) \qquad \text{Equation 1}$$

That is, a tempered glass according to the present invention is a tempered glass having a sheet thickness of 0.6 mm or less and a compression stress layer subjected to chemical tempering at a surface thereof, which satisfies requirements of $CS \times (DOL-20)/DOL > 360$ (Mpa) and $DOL/t \le 0.20$ when the compression stress value of the compression stress layer is represented by CS (Mpa), the depth of the compression stress layer is represented by DOL (μm), and the sheet thickness is represented by t (μm). Incidentally, in the present invention, the compression stress value CS and the depth of the compression stress layer DOL means a value measured by a glass surface stress meter FMS-6000LE manufactured by Orihara Industrial Co., Ltd. "CS×(DOL−20)/DOL" means a value obtained by multiplying CS by a value resulting from subtraction of 20 from DOL and dividing the thus-obtained value by DOL.

In the present invention, it is preferred that the sheet thickness is 0.5 mm or less.

Since the value of the inner stress is prone to increase and the possibility of generation of the breakage of Mode 1 becomes high as the sheet thickness decreases, the effect resulting from the application of the present invention is easily enjoyed when the above configuration is adopted.

In the present invention, it is preferred that the compression stress value is from 500 to 1,200 MPa and the depth of the compression stress layer is from 25 to 60 μm.

When the above configuration is adopted, the resistance to the breakage of both Modes 1 and 2 is easily achieved at a high level.

In the present invention, it is preferred that the tempered glass is chemically tempered by performing chemical strengthening once.

When the above configuration is adopted, the production cost is inexpensive and the management of the process and the quality is facilitated.

In the present invention, it is preferred to contain, as a glass composition, in terms of % by mass, 50 to 80% of $SiO_2$, 8 to 30% of $Al_2O_3$, 0 to 6% of $B_2O_3$, 0 to 2% of $Li_2O$, 5 to 25% of $Na_2O$, 0 to 10% of MgO, and 0 to 15% of $P_2O_5$.

When the above configuration is adopted, it becomes easy to produce a tempered glass having desired stress distribution.

In the present invention, it is preferred that the tempered glass satisfies the following requirement:

In the case of performing a test where an acrylic plate having a thickness of 4 mm, a sandpaper of P320 (the sandpaper being disposed so that an abrading surface of the sandpaper comes into contact with the tempered glass), the tempered glass, and an acrylic plate having a thickness of 4 mm are layered and disposed in this order on a base of a SUS surface plate, and a steel ball of 110 g is dropped on the layered body to evaluate the height at which the tempered glass is broken, an average height at the time of breaking the tempered glass is 43 cm or more. Here, the "sandpaper of P320" means one defined by JIS R6252. Also, the "average height" means an average height for 30 pieces of a sample.

When the above requirement is satisfied, a tempered glass having extremely high resistance to the breakage of Mode 2 is obtained.

In the present invention, it is preferred that the tempered glass satisfies the following requirement:

At a test where the tempered glass and a sandpaper of P100 (the sandpaper being disposed so that an abrading surface of the sandpaper comes into contact with the tempered glass) are disposed in this order on a base of granite, and a steel ball of 4 g is dropped onto the sandpaper from a height of 5 cm to evaluate the number of fragments of the broken tempered glass, the number of fragments of the broken tempered glass is 80 pieces or less on average. Here, the "sandpaper of P100" means one defined by JIS R6252. Also, the "average of the number of fragments" means an average number of fragments for broken samples.

When the above requirement is satisfied, a tempered glass having high resistance to the breakage of Mode 1 is obtained.

Moreover, a cover glass for a mobile terminal according to the present invention is characterized in that it is composed of the tempered glass described above.

Advantages of the Present Invention

A tempered glass of the present invention can achieve the resistance to the breakage of both modes of a mode in which an object having a sharp protrusion strikes the glass surface and the glass is broken due to the generation of a crack that pierces a compression stress layer (Mode 1) and a mode in which an object having a blunt protrusion strikes the glass surface and the glass is broken due to the generation of a crack that does not pierce a compression stress layer (Mode 2) at a high level. Therefore, the glass is suitable for a cover glass for a smartphone or the like whose glass is easily broken due to various causes.

Moreover, since a tempered glass according to the present invention can be produced even by performing a tempering treatment once, a decrease in production costs, simplification of the process, and reduction of burden for quality management are possible.

MODES FOR CARRYING OUT THE PRESENT INVENTION

A tempered glass according to the present invention has a compression stress layer at a surface thereof. As methods for forming the compression stress layer on the surface, there are a physical tempering method and a chemical tempering method. The tempered glass according to the present invention is formed by the chemical tempering method.

The chemical tempering method is a method of introducing an alkali ion having a large ion radius into a glass surface by an ion exchange treatment at a temperature of a strain point of glass or lower. The method has a characteristic feature that, when the compression stress layer is formed by the chemical tempering method, even in the case where the sheet thickness of glass is small, the compression stress layer can be properly formed and also, even when the tempered glass is cut after the compression stress layer is formed, the tempered glass is not easily broken, unlike a physical tempering method such as an air-cooling tempering method.

In the tempered glass of the present invention, the compression stress value CS and the depth of the compression stress layer DOL are in a relationship of CS×(DOL−20)/DOL>360. Here, CS×(DOL−20)/DOL represents the magnitude of the compression stress at a depth of 20 μm from the surface. The reason for the limitation of the magnitude of the compression stress at a depth of 20 μm from the surface is as follows. When the depth of scratches at the cover glass surface is investigated for 180 pieces of smartphones whose cover glasses are not broken, the depth of the scratches is 20 μm at deepest. Moreover, all the confirmed scratches do not pierce the compression stress layer. Accordingly, there is obtained a finding that, for enhancing the resistance to the breakage of Mode 2, it is suitable to increase the magnitude of the compression stress at a depth of 20 μm from the surface sufficiently. Also, it becomes obvious that, when the value of CS×(DOL−20)/DOL exceeds 360, the resulting glass is less prone to be broken in a steel ball dropping test using a sandpaper of P360 to be mentioned later, as compared with a commercially available cover glass which is subjected to a chemical tempering twice. From these facts, it is concluded that, for the resistance to the breakage of Mode 2, it is important that the value of CS×(DOL−20)/DOL exceeds 360.

A preferable range of the value of CS×(DOL−20)/DOL is 370 or more, 380 or more, particularly 390 or more. When the value is too small, the resistance to the breakage of Mode 2 decreases. On the other hand, when the value becomes large, since CS and DOL increase, the internal tensile stress CT becomes large as is understood from the equation 1. Particularly, in the case where the sheet thickness t is small, CT becomes remarkably large and a risk of generation of the breakage of Mode 1 increases. From such circumstances, an upper limit of the value of CS×(DOL−20)/DOL is preferably 500 or less, 450 or less, 440 or less, 430 or less, 425 or less, particularly 420 or less.

The tempered glass of the present invention has a relationship of DOL/t≤0.20. Here, DOL/t represents a ratio of the depth of the compression stress layer (one side) to the sheet thickness. As is already mentioned, when CS and DOL increase, CT becomes large. Particularly, when the sheet thickness t is small, CT becomes remarkably large and a risk of generation of the breakage of Mode 1 increases. Therefore, in the present invention, the ratio of DOL to the sheet thickness is strictly restricted so that CT does not become too large. A preferable range of DOL/t is 0.17 or less, 0.15 or less, particularly 0.13 or less. Incidentally, when DOL is too small, since the breakage of Mode 2 is easily generated, it is preferred that a lower limit of DOL/t is preferably 0.04 or more, particularly 0.05 or more.

The tempered glass of the present invention has a sheet thickness of 0.6 mm or less, preferably 0.5 mm or less, more preferably less than 0.5 mm, further preferably 0.45 mm or less, particularly preferably 0.4 mm or less. As the sheet thickness decreases, it becomes easy to reduce the weight and thickness of a mobile terminal or the like. Also, when the sheet thickness decreases, as is already mentioned, CT becomes large and there is a tendency of easy generation of the breakage of Mode 1, so that the advantage of the present invention that the resistance to the breakage of Mode 1 can be enhanced is easily enjoyed. However, when the sheet thickness becomes too small, the mechanical strength of the material itself becomes insufficient, so that a lower limit of the sheet thickness is preferably 0.1 mm or more, particularly 0.2 mm or more.

The tempered glass of the present invention preferably has a compression stress value CS of the compression stress layer of 500 MPa or more, 540 MPa or more, 600 MPa or more, particularly 670 MPa or more. As the compression stress value increases, the mechanical strength of the tempered glass increases. Particularly, the resistance to the breakage of Mode 2 becomes high. On the other hand, when extremely large compression stress is formed at the surface, the tensile stress CT existing in the tempered glass increases, so that there is a concern of self frangmentation. Also, the resistance to the breakage of Mode 1 decreases. Therefore, it is preferred that the compression stress value of the compression stress layer is 1,200 MPa or less, 1,000 MPa or less, 900 MPa or less, particularly 850 MPa or less. Incidentally, when the content of $Al_2O_3$, $TiO_2$, $ZrO_2$, MgO, and ZnO is increased or the content of SrO and BaO is decreased, the compression stress value tends to increase. Moreover, when the ion exchange time is shortened or the temperature of the ion exchange solution is lowered, the compression stress value tends to increase.

It is preferred that the depth of the compression stress layer DOL is 25 μm or more, 28 μm or more, 30 μm or more, particularly 35 μm or more. As the depth of the compression stress layer increases, it becomes difficult for the scratch formed on the surface to pierce the compression stress layer, so that the resistance to the breakage of Mode 1 increases. On the other hand, as the depth of the compression stress layer increases, the tensile stress CT existing in the tempered glass increases and there is a concern of self frangmentation. Also, it becomes difficult to cut the tempered glass. Therefore, it is preferred that the depth of the compression stress layer is 60 μm or less, 55 μm or less, particularly 50 μm or less. Incidentally, when the content of $K_2O$ and $P_2O_5$ in the glass composition is increased or the content of SrO and BaO is decreased, the depth of the compression stress layer tends to increase. Moreover, when the ion exchange time is lengthened or the temperature of the ion exchange solution is raised, the depth of the compression stress layer tends to increase.

It is preferred that the internal tensile stress value CT determined by the equation 1 is 200 MPa or less, 150 MPa or less, 130 MPa or less, particularly 108 MPa or less. As the internal tensile stress value decreases, the resistance to self frangmentation and the breakage of Mode 1 increases. On the other hand, in order to enhance the resistance to the breakage of Mode 2, it is preferred to increase the compression stress value and the depth of the compression stress layer. Since there is a tendency that the internal tensile stress value increases when the compression stress value and the depth of the compression stress layer are increased, in the present invention, it is preferred that a lower limit of the internal tensile stress value is 60 MPa or more, 80 MPa or more, particularly 85 MPa or more.

The tempered glass of the present invention is preferably one tempered by performing chemical strengthening once. In the present invention, a tempered glass subjected to twice or more times of chemical strengthening steps is not excluded but, in the case of performing the chemical strengthening step twice or more times, the production cost steeply rises. Also, the management of the process and quality becomes difficult. Incidentally, in the present invention, whether the chemical strengthening is performed plural times or not may be judged by observing a cross-section of the chemically tempered glass by a microscope-type wide-range birefringence evaluation system (WPA-micro manufactured by Photonic Lattice, Inc.) or a birefringence imaging system (Abrio manufactured by Tokyo Instruments, Inc.) and investigating the presence of an inflection point on a stress profile.

In the tempered glass of the present invention, the glass composition is not particularly limited but it is a glass composition containing, in terms of % by mass, 50 to 80% of $SiO_2$, 8 to 30% of $Al_2O_3$, 0 to 6% of $B_2O_3$, 0 to 2% of $Li_2O$, 5 to 25% of $Na_2O$, 0 to 10% of MgO, and 0 to 15% of $P_2O_5$. The reasons for limiting the content ranges of the respective components as such will be shown below. Incidentally, in the description of the content ranges of the components, the expression "%" means "% by mass" unless otherwise specified.

$SiO_2$ is a component that forms a network of glass. The content of $SiO_2$ is from 50 to 80%, preferably from 55 to 75%, preferably from 56 to 72%, preferably from 56 to 70%, particularly preferably from 57 to 67%. When the content of $SiO_2$ is too small, vitrification becomes difficult and the thermal expansion coefficient becomes too high, so that thermal shock resistance easily lowers. On the other hand, when the content of $SiO_2$ is too large, meltability and formability are prone to decrease and the thermal expansion coefficient becomes too low, so that it becomes difficult to match the thermal expansion coefficient with those of peripheral materials.

$Al_2O_3$ is a component that enhances ion exchange performance and also enhances the strain point and Young's modulus. The content of $Al_2O_3$ is from 8 to 30%, preferably from 10 to 28%, preferably from 14 to 25%, particularly preferably from 16 to 22%. When the content of the $Al_2O_3$ is too small, there arises a concern that the ion exchange performance is not sufficiently exhibited. On the other hand, when the content of $Al_2O_3$ is too large, devitrified crystals are easily precipitated in the glass, and it becomes difficult to form a glass sheet by an overflow down-draw method or the like. In particular, when a glass sheet is formed by an overflow down-draw method through use of an alumina compact, a devitrified crystal of spinel is easily precipitated at an interface between the glass sheet and the alumina compact. Further, the thermal expansion coefficient becomes too low, and it becomes difficult to match the thermal expansion coefficient with those of peripheral materials. In addition, acid resistance also lowers, which makes it difficult to apply the tempered glass to an acid treatment step. Further, viscosity at high temperature increases, and the meltability easily lowers.

$B_2O_3$ is a component that lowers the viscosity at high temperature and density, and also stabilizes glass so that a crystal may be unlikely to be precipitated, and lowers the liquidus temperature. The content of $B_2O_3$ is from 0 to 10%, preferably from 0 to 8%, preferably 0.05 to 6%, particularly preferably 0.1 to 3%. When the content of $B_2O_3$ is too large, the ion exchange treatment causes coloring called "weathering" to occur at a surface of the glass, the water resistance deteriorates, and the thickness of the compression stress layer is prone to decrease.

$Li_2O$ is an ion exchange component and is a component that lowers the viscosity at high temperature to increase the meltability and the formability, and increases the Young's modulus. Further, $Li_2O$ has a great effect of increasing the compression stress value among alkali metal oxides, but when the content of $Li_2O$ becomes extremely large in a glass system containing $Na_2O$ at 7% or more, the compression stress value tends to lower contrarily. Moreover, when the content of $Li_2O$ is too large, the liquidus viscosity lowers, resulting in easy devitrification of the glass, and also the thermal expansion coefficient becomes too high, so that the thermal shock resistance lowers and it becomes difficult to match the thermal expansion coefficient with those of peripheral materials. In addition, the viscosity at low temperature becomes too low, and the stress relaxation occurs easily, so that the compression stress value lowers contrarily in some cases. Accordingly, the content of $Li_2O$ is from 0 to 2%, preferably from 0 to 1.5%, preferably from 0 to 1%, preferably from 0 to 0.5%, preferably from 0 to 0.1%, and particularly preferably from 0 to 0.05%.

$Na_2O$ is an ion exchange component and is a component that lowers the viscosity at high temperature to increase the meltability and formability. $Na_2O$ is also a component that improves the devitrification resistance. When the content of $Na_2O$ is too small, the meltability lowers, the thermal expansion coefficient lowers, and the ion exchange performance is prone to lower. Accordingly, the content of $Na_2O$ is from 5 to 25%, preferably from 7 to 20%, preferably from 10 to 18%, particularly preferably from 12 to 18%. On the other hand, when the content of $Na_2O$ is too large, the thermal expansion coefficient becomes too high, so that the thermal shock resistance lowers, and it becomes difficult to match the thermal expansion coefficient with those of peripheral materials. Further, the strain point lowers excessively, and the glass composition loses its component balance, so that the devitrification resistance lowers contrarily in some cases.

MgO is a component that reduces the viscosity at high temperature to enhance the meltability and formability and increases the strain point and Young's modulus, and is a component that has a great effect of enhancing the ion exchange performance among alkaline earth metal oxides. Accordingly, the content of MgO is from 0 to 10%, preferably from 0.1 to 8%, preferably from 1 to 6%, preferably from 1.2 to 4%, particularly preferably from 2 to 3.5%. When the content of MgO is too large, the density and thermal expansion coefficient easily increase, and the devitrification of the glass tends to occur easily. Particularly, in the case where a glass sheet is formed by an overflow down-draw method using an alumina compact, a devitrified crystal of spinel is easily precipitated at an interface with the alumina compact.

$P_2O_5$ is a component that enhances the ion exchange performance and is a component that increases the thickness of the compression stress layer, in particular. However, when the content of $P_2O_5$ is too large, the glass undergoes phase separation, and the water resistance is prone to lower. Accordingly, the content of $P_2O_5$ is from 0 to 15%, preferably from 0 to 10%, preferably from 0 to 3%, preferably from 0 to 1%, particularly preferably from 0 to 0.5%.

For example, the following components other than the components mentioned above may be added.

$K_2O$ is a component that promotes ion exchange and is a component that allows the thickness of the compression stress layer to be easily enlarged among alkali metal oxides. $K_2O$ is also a component that lowers the viscosity at high temperature to increase the meltability and formability. Further, $K_2O$ is also a component that improves devitrification resistance. However, when the content of $K_2O$ is too large, the thermal expansion coefficient becomes too large, the thermal shock resistance lowers, and it becomes difficult to match the thermal expansion coefficient with those of peripheral materials. Further, the strain point lowers excessively, and the glass composition loses its component balance, so that the devitrification resistance tends to lower contrarily. Accordingly, the content of $K_2O$ is preferably from 0 to 10%, preferably from 0 to 8%, preferably from 0 to 5%, particularly preferably from 0 to 3%.

CaO has greater effects of lowering the viscosity at high temperature to enhance the meltability and formability and increasing the strain point and Young's modulus without involving a decrease in devitrification resistance as compared to other components. However, when the content of CaO is too large, the density and thermal expansion coefficient increase, and the glass composition loses its component balance, so that the glass is prone to devitrify contrarily, the ion exchange performance lowers, and the deterioration of an ion exchange solution tends to occur easily. Accordingly, the content of CaO is preferably from 0 to 6%, preferably from 0 to 4%, preferably from 0 to 2%, preferably from 0 to 1%, preferably from 0 to 0.5%, particularly preferably from 0 to 0.1%.

SrO is a component that lowers the viscosity at high temperature to enhance the meltability and formability, and increases the strain point and Young's modulus. However, when the content thereof is too large, an ion exchange reaction is prone to be inhibited, and in addition, the density and thermal expansion coefficient increase and the devitrification of the glass occurs easily. Accordingly, the content of SrO is preferably from 0 to 2%, preferably from 0 to 1%, preferably from 0 to 0.5%, particularly preferably from 0 to 0.1%.

BaO is a component that lowers the viscosity at high temperature to enhance the meltability and formability, and increases the strain point and Young's modulus. However, when the content of BaO is too large, an ion exchange reaction is prone to be inhibited, and in addition, the density and thermal expansion coefficient increase, and the devitrification of the glass occurs easily. Accordingly, the content of BaO is preferably from 0 to 6%, preferably from 0 to 3%, preferably from 0 to 1.5%, preferably from 0 to 1%, preferably from 0 to 0.5%, particularly preferably from 0 to 0.1%.

TiO$_2$ is a component that enhances the ion exchange performance and is a component that lowers the viscosity at high temperature. However, when the content thereof is too large, the glass is prone to be colored and to devitrify. Accordingly, the content of TiO$_2$ is preferably from 0 to 4.5%, more preferably from 0 to 0.5%, particularly preferably from 0 to 0.3%.

ZrO$_2$ is a component that remarkably enhances the ion exchange performance, and is a component that increases the viscosity around the liquidus viscosity and the strain point. However, when the content thereof is too large, there is a concern that the devitrification resistance may lower markedly, and there is also a concern that the density may increase excessively. Accordingly, the content of ZrO$_2$ is preferably from 0 to 5%, preferably from 0 to 4%, preferably from 0 to 3%, particularly preferably from 0.001 to 2%.

ZnO is a component that enhances the ion exchange performance and is a component that has a great effect of increasing the compression stress value, in particular. Further, it is a component that lowers the viscosity at high temperature of glass without lowering the viscosity at low temperature. However, when the content of ZnO is too large, there is a tendency that the glass undergoes phase separation, the devitrification resistance lowers, the density increases, and the thickness of the compression stress layer decreases. Accordingly, the content of ZnO is preferably from 0 to 6%, preferably from 0 to 5%, preferably from 0 to 3%, particularly preferably from 0 to 1%.

As a fining agent, one kind or two or more kinds selected from the group consisting of Cl, SO$_3$, and CeO$_2$ (preferably the group consisting of Cl and SO$_3$) may be added at from 0 to 3%.

SnO$_2$ has an effect of enhancing ion exchange performance. Accordingly, the content of SnO$_2$ is preferably from 0 to 3%, preferably from 0.01 to 3%, preferably from 0.05 to 3%, preferably from 0.1 to 3%, and particularly preferably from 0.2 to 3%.

The content of Fe$_2$O$_3$ is preferably less than 1,000 ppm (less than 0.1%), preferably less than 800 ppm, preferably less than 600 ppm, preferably less than 400 ppm, and particularly preferably less than 300 ppm.

A rare earth oxide such as Nd$_2$O$_3$ or La$_2$O$_3$ is a component that enhances the Young's modulus. However, the cost of the raw material itself is high, and when the rare earth oxide is added in a large amount, the devitrification resistance is prone to lower. Accordingly, the content of the rare earth oxide is preferably 3% or less, preferably 2% or less, preferably 1% or less, preferably 0.5% or less, particularly preferably 0.1% or less.

It is preferred that the tempered glass of the present invention is substantially free of As$_2$O$_3$, Sb$_2$O$_3$, PbO, F, and Bi$_2$O$_3$ as a glass composition from the standpoint of environmental considerations. Here, the gist of the phrase "substantially free of As$_2$O$_3$" resides in that As$_2$O$_3$ is not added positively as a glass component, but contamination with As$_2$O$_3$ in an impurity level is allowable, and specifically, the phrase means that the content of As$_2$O$_3$ is less than 0.1%. The gist of the phrase "substantially free of Sb$_2$O$_3$" resides in that Sb$_2$O$_3$ is not added positively as a glass component, but contamination with Sb$_2$O$_3$ in an impurity level is allowable, and specifically, the phrase means that the content of Sb$_2$O$_3$ is less than 0.1%. The gist of the phrase "substantially free of PbO" resides in that PbO is not added positively as a glass component, but contamination with PbO in an impurity level is allowable, and specifically, the phrase means that the content of PbO is less than 0.1%. The gist of the phrase "substantially free of F" resides in that F is not added positively as a glass component, but contamination with F in an impurity level is allowable, and specifically, the phrase means that the content of F is less than 0.1%. The gist of the phrase "substantially free of Bi$_2$O$_3$" resides in that Bi$_2$O$_3$ is not added positively as a glass component, but contamination with Bi$_2$O$_3$ in an impurity level is allowable, and specifically, the phrase means that the content of Bi$_2$O$_3$ is less than 0.05%.

The tempered glass of the present invention preferably satisfies the following requirements.

Figure 1:
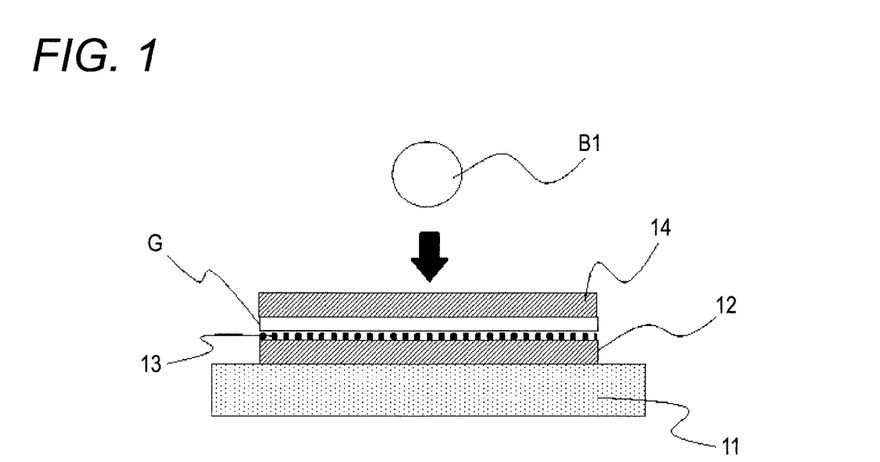
FIG. 1 is a schematic view explaining a test method for evaluating the breakage of Mode 2.

As shown in FIG. 1, an acrylic plate 12 having a thickness of 4 mm, a sandpaper 13 of P320 (the sandpaper 13 being disposed so that an abrading surface thereof comes into contact with the tempered glass G), the tempered glass G, and an acrylic plate 14 having a thickness of 4 mm are layered and disposed in this order on a base 11 of a SUS surface plate, and a steel ball B1 of 110 g is dropped on the acrylic plate 14. The height from which the steel ball B1 is dropped is gradually increased and the height at which the tempered glass G is broken is evaluated. When the test is performed, an average height at the time of breaking the tempered glass G is 43 cm or more.

This test is suitable for the evaluation of the resistance to the breakage of Mode 2 (a mode in which an object having a blunt protrusion strikes the glass surface and the glass is broken due to the generation of a crack that does not pierce a compression stress layer). In a tempered glass having a sheet thickness of 0.6 mm or less, when the requirement of CS×(DOL−20)/DOL>360 is satisfied, a practically usable resistance to the breakage of Mode 2 can be assured. In the case where the above requirement is satisfied, it can be judged that the glass has further high resistance.

The test method will be precisely described: first, the steel ball is dropped from a height of 15 cm and, in case where the tempered glass is not broken, the dropping height of the steel ball is increased in increments of 5 cm. Thus, the test is performed with changing the height until the tempered glass is broken. The height at which the tempered glass is broken is recorded, the height at break is subjected to Weibull plotting, and the value at which breaking probability reaches 63% is calculated as an average value. The number of samples is 30. Incidentally, in untempered glass or glass whose degree of tempering is small, there is a case where the glass is cracked but not cleaved. In this case, a case where the crack entering into a perpendicular direction reaches a depth of a half or more of the sheet thickness is judged to be broken.

Also, the tempered glass of the present invention preferably satisfies the following requirements.

Figure 2:
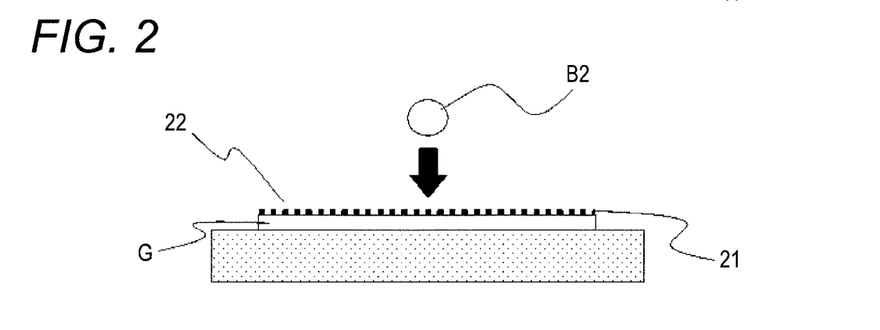
FIG. 2 is a schematic view explaining a test method for evaluating the breakage of Mode 1.

As shown in FIG. 2, the tempered glass G and a sandpaper 22 of P100 are disposed in this order on a base 21 of granite (the sandpaper being disposed so that an abrading surface of the sandpaper comes into contact with the tempered glass G) and a steel ball B2 of 4 g is dropped onto the sandpaper 22 from a height of 5 cm to evaluate the number of fragments of the broken tempered glass G. At this test, the number of fragments of the broken tempered glass is 80 pieces or less on average (preferably 50 pieces or less, particularly 20 pieces or less). Here, the "sandpaper of P100" means one defined by JIS R6252. Also, as the tempered glass G, one having a size of 65 mm×130 mm is used. The number of samples is 30.

This test is suitable for evaluation of the resistance to the breakage of Mode 1 (a mode in which an object having a sharp protrusion strikes the glass surface and the glass is broken due to the generation of a crack that pierces a compression stress layer). In a tempered glass having a thickness of 0.6 mm or less, when the requirement of DOL/t≤0.20 is satisfied, a practically usable resistance to the breakage of Mode 1 can be assured. In the case where the above requirement is satisfied, it can be judged that the glass has further high resistance.

The following will describe a method for producing the tempered glass of the present invention. However, the method for producing the glass of the present invention should not be construed as being limited thereto.

First, glass raw materials, which have been blended so as to have the above-mentioned glass composition, are loaded in a continuous melting furnace, are melted by heating at from 1,500 to 1,600° C., and are fined. Thereafter, the resultant is fed to a forming apparatus, is formed into a sheet shape or the like, and is annealed. Thus, a glass sheet or the like can be produced.

An overflow down-draw method is preferably adopted as a method of forming the glass sheet. The overflow down-draw method is a method by which a high-quality glass sheet can be produced in a large amount, and by which even a large-size glass sheet can be easily produced. In addition, the fictive temperature Tf of the glass sheet can be easily increased. Further, in the overflow down-draw method, alumina or dense zircon is used as a compact. The glass to be tempered of the present invention has satisfactory compatibility with alumina and dense zircon, in particular, alumina (hardly reacts with the compact to generate bubbles, stones, or the like).

Various forming methods other than the overflow down-draw method may also be adopted. For example, forming methods such as a float method, a down draw method (such as a slot down method or a re-draw method), a roll out method, and a press method may be adopted.

Next, the resultant glass to be tempered is subjected to chemical strengthening, thereby being able to produce a tempered glass. The chemical tempering may be performed with adjusting the kind of the molten salts and mixing ratio of the salts, the temperature of the molten salts, and treating time so as to satisfy the various requirements mentioned above.

In the case where it is intended to cut the tempered glass into pieces having predetermined sizes, it may be cut before the tempering treatment or after the tempering treatment.

EXAMPLES

The present invention is hereinafter described based on Examples. It should be noted that the following Examples are merely illustrative and the present invention is by no means limited to these Examples.

Table 1 shows compositional examples of glasses (Glasses a to h) to be used in the present Examples.

TABLE 1

|  |  | a | b | c | d | e | f | g | h |
|---|---|---|---|---|---|---|---|---|---|
| Glass Composition | $SiO_2$ | 61.5 | 66.0 | 58.8 | 61.7 | 61.19 | 62.4 | 57.4 | 61.2 |
| (% by mass) | $Al_2O_3$ | 18.0 | 14.2 | 21.4 | 19.7 | 16.2 | 12.9 | 13.0 | 20.1 |
|  | $B_2O_3$ | 0.5 | 2.3 | 4.9 | 3.6 | 0.8 | 2.0 | 2.0 | — |
|  | $Li_2O$ | 0.1 | 0.1 | — | — | — | 0.1 | 0.1 | — |
|  | $Na_2O$ | 14.5 | 13.4 | 13.1 | 13.2 | 14.1 | 16.0 | 14.5 | 15.9 |
|  | $K_2O$ | 2.0 | 0.6 | — | — | 3.4 | 2.0 | 4.8 | — |
|  | MgO | 3.0 | 3.0 | 1.5 | 1.5 | 3.6 | — | 2.1 | 2.6 |
|  | CaO | — | — | — | — | 0.5 | 2.0 | 1.8 | — |
|  | $ZrO_2$ | — | — | 0.1 | 0.1 | 0.01 | 2.5 | 4.0 | — |
|  | $SnO_2$ | 0.4 | 0.4 | 0.2 | 0.2 | 0.2 | 0.1 | 0.3 | 0.2 |

Glass raw materials were blended so as to have the glass composition of Glass a, and melted at 1,600° C. for 8 hours using a platinum pot. Thereafter, the resultant molten glass was poured onto a carbon plate so as to be formed into a sheet shape and after annealing, the both surfaces were polished so as to be a sheet thickness of 0.4 mm.

The thus obtained Glass a was subjected to chemical strengthening to obtain a sample. Table 2 shows Examples of the present invention (Sample Nos. 1 to 3) and Comparative Examples (Sample Nos. 4 to 7).

TABLE 2

|  | CS (MPa) | DOL (μm) | CT (Mpa) | CS*(DOL-20)/DOL | DOL/t | Conditions for chemical strengthening | | | Average height at break (cm) | Average number of fragments (piece) |
|---|---|---|---|---|---|---|---|---|---|---|
|  |  |  |  |  |  | $NaNO_3$ (%) | Temperature (° C.) | Time (min) |  |  |
| 1 | 683 | 55.9 | 132.5 | 438.6 | 0.14 | 5 | 430 | 354 | 108 | 70 |
| 2 | 793 | 43.2 | 109.2 | 425.9 | 0.11 | 2.3 | 430 | 209 | 89 | 40 |
| 3 | 800 | 40 | 100.0 | 400.0 | 0.10 | 2.4 | 430 | 178 | 73 | 10 |
| 4 | 773 | 87.3 | 299.4 | 595.9 | 0.22 | 0.1 | 430 | 880 | 126 | 1000 or more |
| 5 | 952 | 19.6 | 51.7 | −19.4 | 0.05 | 0.5 | 430 | 40 | 16 | 2 |

TABLE 2-continued

|   | CS (MPa) | DOL (μm) | CT (Mpa) | CS*(DOL-20)/DOL | DOL/t | Conditions for chemical strengthening | | | Average height at break (cm) | Average number of fragments (piece) |
|---|---|---|---|---|---|---|---|---|---|---|
|   |   |   |   |   |   | NaNO$_3$ (%) | Temperature (° C.) | Time (min) |   |   |
| 6 | 1021 | 27 | 79.7 | 264.7 | 0.07 | 0 | 430 | 160 | 20 | 4 |
| 7 | 425 | 52.5 | 75.6 | 263.1 | 0.13 | 19 | 450 | 210 | 22 | 4 |

After optical polishing was performed on both surfaces of each sample, it was subjected to an ion exchange treatment under conditions shown in Table 2. Incidentally, the content of NaNO$_3$ in the table indicates the ratio in the molten salt and the remainder of the molten salt is KNO$_3$. Subsequently, the compression stress value (CS) of the compression stress layer and depth of the compression stress layer (DOL) at the surfaces were calculated on the basis of the number of interference fringes observed using a surface stress meter (FSM-6000LE manufactured by Orihara Industrial Co., Ltd.) and intervals therebetween. In the calculation, the refractive index and optical elastic constant of each sample were defined as 1.51 and 30 ((nm/cm)/MPa), respectively.

Then, for each sample, the resistance to the breakage of Mode 2 was evaluated by the following test method. First, as shown in FIG. 1, an acrylic plate 12 having a thickness of 4 mm, a sandpaper 13 of P320 (the sandpaper being disposed so that an abrading surface thereof comes into contact with the tempered glass), the tempered glass G, and an acrylic plate 14 having a thickness of 4 mm were layered and disposed in this order on a base 11 of a SUS surface plate, and a steel ball B1 of 110 g was dropped on the acrylic plate 14. The dropping was started from a height of 15 cm, the height was raised at an increment of 5 cm, and the height at which the tempered glass G was broken was determined. This test was performed 30 times per a sample having the same composition and average height at the time of breaking the tempered glass sample was calculated. The results are shown in Table 2 and FIG. 3. When the average height at the time of breaking is 43 cm or more, it can be judged that the sample has a sufficient resistance to the breakage of Mode 2.

Also, for each sample, the resistance to the breakage of Mode 1 was evaluated by the following test method. First, as shown in FIG. 2, the tempered glass G and a sandpaper 22 of P100 were disposed in this order on a base 21 of granite (the sandpaper 22 being disposed so that an abrading surface of the sandpaper comes into contact with the tempered glass G), and a steel ball B2 of 4 g is dropped onto the sandpaper 22 from a height of 5 cm. Subsequently, the number of fragments of the broken tempered glass G was counted. This test was performed 30 times per a sample having the same composition and average number of fragments at the time of breaking the tempered glass sample was calculated. In this test, when the number of fragments of the broken tempered glass G is 20 pieces or less on average, it can be judged that the sample has a sufficient resistance to the breakage of Mode 1.

Figure 3:
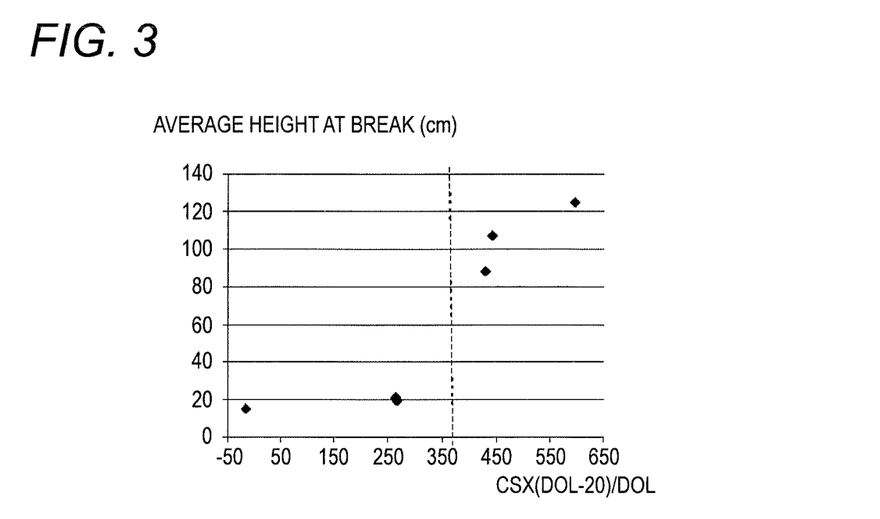
FIG. 3 is a graph illustrating evaluation results of Examples.

As is apparent from Table 2 and FIG. 3, in Examples Nos. 1 to 3 that are Working Examples, the values of CS×(DOL−20)/DOL exceeded 360 and the average height at break was 73 cm or more. Moreover, the values of DOL/t was 0.20 or less and the average number of fragments was 80 pieces or less. On the other hand, in Example 4 that is Comparative Example, DOL/t exceeded 0.20 and the average number of fragments was so much as 1,000 pieces or more. Further, in Examples 5 to 7, the values of CS×(DOL−20)/DOL was 360 or less and the average height at break was so low as 22 cm or less.

Incidentally, in the present Working Examples, evaluation was performed only for Glass a, but it is considered that the same results may be obtained for Glasses b to h.

INDUSTRIAL APPLICABILITY

The tempered glasses of the present invention are suitable for a cover glass of mobile terminals such as a cellular phone, a smartphone, and a tablet terminal. Further, the tempered glass of the present invention can be expected to find use in applications such as a cover glass for a digital camera or the like, or a substrate for a display (especially, a touch panel display), a substrate for a magnetic disk, a cover glass for a solid image pick-up element, and the like, in addition to the above-mentioned uses.

DESCRIPTION OF REFERENCE NUMERALS AND SIGNS 11, 21: Base
12, 14: Acrylic sheet
13, 22: Sand paper
B1, B2: Steel ball
G: Tempered glass

The invention claimed is:

1. A tempered glass having a sheet thickness of less than 0.5 mm and a compression stress layer subjected to chemical tempering at a surface of the tempered glass, which satisfies CS≥670, 360<CS×(DOL−20)/DOL≤430, DOL/t≤0.20, and 85≤CT≤109.2,
    wherein CS (Mpa) represents a compression stress value caused by the compression stress layer, DOL (μm) represents a depth of the compression stress layer, t (μm) represents a sheet thickness of the compression stress layer, and CT (MPa) represents an internal tensile stress value of the compression stress layer.

2. The tempered glass according to claim 1, wherein the compression stress value is from 670 to 1,200 MPa and the depth of the compression stress layer is from 25 to 60 μm.

3. The tempered glass according to claim 1, which is subjected to chemical tempering by performing chemical strengthening once.

4. The tempered glass according to claim 1, having the compression stress layer at the surface thereof, which comprises as a glass composition, in terms of % by mass, 50 to 80% of SiO$_2$, 8 to 30% of Al$_2$O$_3$, 0 to 6% of B$_2$O$_3$, 0 to 2% of Li$_2$O, 5 to 25% of Na$_2$O, 0 to 10% of MgO, and 0 to 15% of P$_2$O$_5$.

5. The tempered glass according to claim 1, which satisfies the following requirement:
    at a test where an acrylic plate having a thickness of 4 mm, a sandpaper of P320, the tempered glass, and an acrylic plate having a thickness of 4 mm are layered and disposed in this order on a base of a SUS surface plate and a steel ball of 110 g is dropped on the layered body to evaluate a height at which the tempered glass is broken, an average height at the time of breaking the tempered glass is 43 cm or more, wherein the sandpaper is disposed so that an abrading surface of the sandpaper comes into contact with the tempered glass.

6. The tempered glass according to claim 1, which satisfies the following requirement:
at a test where the tempered glass and a sandpaper of P100 are disposed in this order on a base of granite and a steel ball of 4 g is dropped onto the sandpaper from a height of 5 cm to evaluate the number of fragments of the broken tempered glass, the number of fragments of the broken tempered glass is 20 pieces or less on average, wherein, the sandpaper is disposed so that an abrading surface of the sandpaper comes into contact with the tempered glass.

7. A cover glass for a mobile terminal, comprising a tempered glass according to claim 1.

8. The tempered glass according to claim 1, which further satisfies the following requirement: $0.10 \leq DOL/t \leq 0.20$.

\* \* \* \* \*